3,457,297
PROCESS FOR DIRECT ESTERIFICATION OF AROMATIC DICARBOXYLIC ACIDS WITH GLYCOLS
Wolfgang Muller, Offenbach am Main, Germany, assignor to Hans J. Zimmer, Aktiengesellschaft
No Drawing. Filed July 28, 1966, Ser. No. 568,403
Int. Cl. C07c *69/82, 69/80;* C08g *17/08*
U.S. Cl. 260—475                                                 6 Claims

ABSTRACT OF THE DISCLOSURE

A process for the direct esterification of aromatic dicarboxylic acids, particularly of the isomeric phthalic acids with glycols in the presence of bismuth triaryl or bismuth aryl- halogen compounds as catalysts. The bismuth aryl- halogen compounds are of the type $BiR_3X_2$, wherein R is aryl and X is halogen. Particularly good catalysts for the process are bismuth triphenyl, bismuth trinaphthyl, bismuth tritolyl, bismuth triphenyl dibromide, bismuth triphenyl dichloride. The resultant esters are useful as intermediates in the production of polymers.

---

The invention relates to a process for the esterification of aromatic dicarboxylic acids, especially of the isomeric phthalic acids, with glycols.

Glycol esters of aromatic dicarboxylic aids are widely used as intermediates in the production of high polymers, especially the diglycol ester of terephthalic acid for the production of polyethylene terephthalate. As is known in the art, it is technically difficult to effect esterification of terephthalic acid with, for example, ethylene glycol. This difficulty arises from the specific properties of terephthalic acid and ethylene glycol. Limited solubility of terephthalic acid and ethylene glycol in most known solvents leads to unduly long esterification times.

If the reaction is catalyzed by use of esterification catalysts well known in the art, such catalysts usually accelerate undesirable side reactions of ether formation between two or more glycol molecules. The esters thus produced are always contaminated with glycol ethers, and in further processing, there results polymers having undesirable properties. For example, the melting point of the polyethylene terephthalate thus produced is more than 10° C. lower than that of the polymer obtained according to the more commonly used method form dimethyl terephthalate through transesterification with ethylene glycol and subsequent polycondensation.

To reduce further the esterification time, it is generally necessary to operate at temperatures below the boiling point of glycol and under pressure. The installation costs of an esterification apparatus to so operate are, of course, higher than when it is possible to operate without pressure. The elevated esterification temperature required when working under pressure causes further damage to the desired glycol ester and subsequently quality loss on the properties of the final polymer.

I have now found new catalysts which permit effecting the above-described direct esterification without the drawbacks mentioned. The esterification using my new catalysts is effected preferably without elevated pressure at temperatures of 190 to 260° C. and yields glycol esters which in further processing, for example into polyethylene terephthalate according to one of the usual art-recognized methods, yield very good products with high melting points and high viscosities.

It is therefore the object of my invention to provide a process for the direct esterification of aromatic dicarboxylic acids with glycols in the presence of new catalysts, particularly bismuth triaryl- or bismuth aryl- halogen compounds. In the bismuth organic compounds, the bismuth is bound directly to carbon atoms of aryl residues. In addition to the bonds between bismuth and the C-atoms of the aryl residues, there may also be bonds between the bismuth and halogens. The latter are then compounds of pentavalent bismuth of the type $BiR_3X_2$, wherein R is aryl and X is halogen.

Particularly good catalysts for the process of my invention are bismuth triphenyl, bismuth trinaphthyl, bismuth tritolyl, bismuth triphenyl dibromide, bismuth triphenyl dichloride and similar compounds.

When using various polycondensation catalysts in the subsequent production of polyethylene terephthalate, the above-disclosed esterification catalysts may cause graying of the polymerizate. If a pure white polymerizate is desired, the above-mentioned esterification catalysts can be removed directly from the esterification reaction mixture through precipitation reactions, for example, with sodium sulfide or other precipitating or reducing agents, and subsequent filtration. The esterification product obtained in this manner yields pure white polymerizates upon subsequent polycondensation with any conventional polycondensation catalyst.

The invention is particularly described by the following non-limiting examples. Unless otherwise indicated, all the parts are parts by weight and all the percentages are percentages by weight.

Example I 83 parts of terephthalic acid, 125 parts of ethylene glycol and 0.11 part of bismuth triphenyl were heated while stirring in an electrically-heated reaction vessel provided with an agitator and distillation column. At the boiling point of the glycol, the reaction commenced and water was split off. Over a reaction period of 3½ hours, the sump temperature rose to about 204° C. During this time, the reaction composition became increasingly more fluid and, finally, crystal clear. During the reaction period at a temperature close to 100° C., about 17 parts of water passed over the head of the column. After cooling, the esterification product was of a waxy consistency and was pure white.

The polyester yielded upon subsequent polycondensation was slightly gray-colored, could be stretched well, and melted at about 246° C.

Example II

The reaction of Example I was repeated. After completion of the esterification reaction 0.11 part of $$Na_2S \cdot 9H_2O$$

were added to the hot solution. The resulting black-brown precipitate was filtered off. The cooled filtrate was a waxy solid and pure white. Subsequent polycondensation yielded a product having the same properties as in Example I, but in contrast, was colorless and showed no grayish tinge.

Example III 83 parts of terephthalic acid, 68 parts of ethylene glycol and 0.11 part of bismuth triphenyl were heated in a reaction vessel as in Example I. The esterification reaction commenced at the boiling point of the glycol. The reaction composition became more fluid and, after 290 minutes, clear. During this time, there was removed 18 parts of reaction water in the head of the column. The final temperature in the sump was 216° C.

The catalyst was precipitated out as in Example II. The cold filtrate formed a semicrystalline, solid white mass. Polycondensation of this esterification product yielded a white, well-stretchable polyester having a melting point of 258 to 260° C. and an intrinsic viscosity of 0.60 (measured in phenol tetrachloroethane).

By raising the ratio of glycol terephthalic acid or by increasing the amount of catalyst used, the reaction time can be considerably shortened.

Example IV 83 parts of terephthalic acid, 93 parts of ethylene glycol and 0.05 mol. percent of bismuth triphenyl dibromide were heated together as described in the preceding examples. At the boiling point of the glycol, the reaction commenced. Over a period of 255 minutes, there was drawn off at the head of the column 17.5 parts of water. The resulting clear mixture contained diglycol terephthalate which was polycondensed in the usual manner.

Example V

In the manner above described, 83 parts of terephthalic acid and 93 parts of ethylene glycol were reacted under stirring in the presence of 0.05 mol. percent (with reference to terephthalic acid) bismuth triphenyl dichloride. In 2½ hours, the terephthalic acid went into solution as diglycol ester. The sump temperature rose to 220° C. and at the head of the column the theoretical amount of water was drawn off. The resulting glycol ester yielded, in subsequent polycondensation, polyethylene terephthalate of a melting point above 253° C.

Having described my invention, I intend the scope thereof to be limited solely by the following claims.

I claim:

1. In the process for esterification of benzene dicarboxylic acids with glycols, the improvement wherein the esterification is effected at a temperature in the range of from about 190° C. to 260° C. in the presence, as a catalyst, of bismuth triaryl compounds or bismuth aryl halogen compounds of the type $BiR_3X_2$, wherein aryl and R are selected from the group consisting of phenyl, naphthyl, and tolyl, and X is halogen.

2. Process of claim 1 wherein said catalyst is precipitated out of the reaction mixture after completion of the esterification.

3. Process of claim 1 wherein said catalyst is bismuth triphenyl, bismuth trinaphthyl, bismuth tritolyl, bismuth triphenyl dibromide or bismuth triphenyl dichloride.

4. Process of claim 1 wherein said benzene dicarboxylic acid is terephthalic acid.

5. Process of claim 4 wherein said glycol is ethylene glycol.

6. Process of claim 5 wherein said catalyst is bismuth triphenyl, bismuth trinaphthyl, bismuth tritolyl, bismuth triphenyl dibromide or bismuth triphenyl dichloride.

References Cited

UNITED STATES PATENTS 3,245,959  4/1966  Roeser _____ 260—75

JAMES A. PATTEN, Primary Examiner

E. J. SKELLY, Assistant Examiner

U.S. Cl. X.R.

260—75

UNITED STATES PATENT OFFICE

CERTIFICATE OF CORRECTION

Patent No. 3,457,297                          Dated July 22, 1969

Wolfgang Karl Heinz Muller

It is certified that error appears in the above-identified patent and that said Letters Patent are hereby corrected as shown below:

In column 1, line 6, the name of the assignee "Hans J. Zimmer, Aktiengesellschaft" is incorrect and should read -- Vickers-Zimmer Aktiengesellschaft, Planung und Bau von Industrieanlagen --.

SIGNED AND
SEALED
FEB 17 1970

(SEAL)
Attest:

Edward M. Fletcher, Jr.
Attesting Officer

WILLIAM E. SCHUYLER, JR.
Commissioner of Patents